Figure 1:
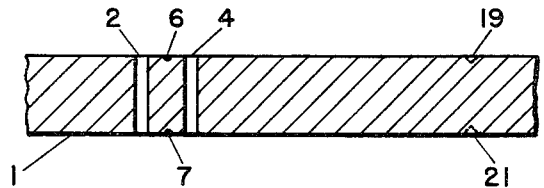

Dec. 18, 1962     A. R. GUNNERT     3,068,688
METHOD FOR MEASURING UNI- OR TRI-AXIAL INHERENT STRESSES
Filed March 25, 1958     2 Sheets-Sheet 1

INVENTOR
ANDERS RUDOLF GUNNERT
By *Larson and Taylor*
ATTORNEYS

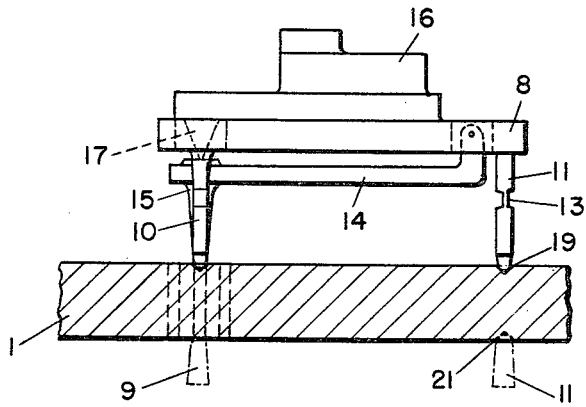
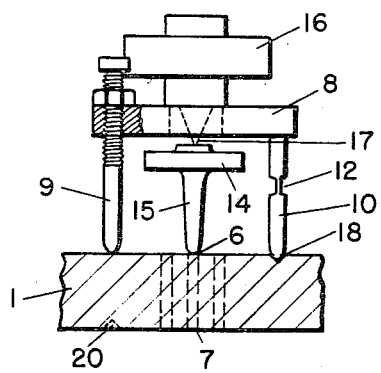
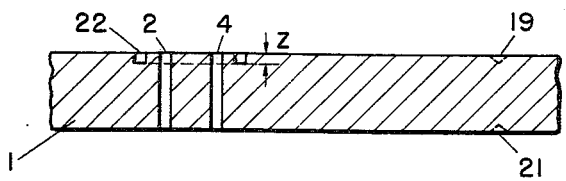
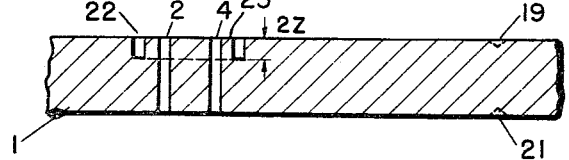

United States Patent Office 3,068,688
Patented Dec. 18, 1962

3,068,688
METHOD FOR MEASURING UNI- OR TRI-AXIAL INHERENT STRESSES
Anders Rudolf Gunnert, Lidingo, Sweden, assignor to Svenska Aktiebolaget Gasaccumulator, Lidingo, Sweden, a corporation of Sweden
Filed Mar. 25, 1958, Ser. No. 723,686
Claims priority, application Sweden Mar. 30, 1957
6 Claims. (Cl. 73—88)

The present invention refers to a method and apparatus for measuring the inherent stresses present in the interior of a material, the object being primarily to measure the stresses normal to the surface of the material, such as a metal sheet. However, the method also makes it possible to measure the stresses in the measuring area in the two mutually perpendicular directions which are parallel to the said surface. All of these measurements can be performed at intervals all through the material from one surface thereof to the other so as to determine the inherent stresses at different levels of the material. This possibility of measuring the inherent stresses in the interior of a material is of particular value for checking the quality of welded material. In addition, the measuring process has the advantage of causing little or no change in the strength of the weld material.

According to the invention, a pair of markings are made on opposite surfaces of the material. The markings are aligned in a plane normal to the opposite surfaces. Around one of the markings a measuring body of the material is cut free with a depth that is increased stepwise from one of the material surfaces until the other surface is reached. After each increase of the depth of the measuring body by one step, the mutual spacing of the markings or their levels relative to the adjacent material surface is measured. In this manner, a measure is obtained of the changes in spacing between the markings, i.e. the deformations normal to the material surface that the measuring body has undergone in the step-by-step cutting. It is now possible by means of conventional formulas to compute the stresses normal to the material surface at the different levels.

For the determination of the stresses parallel to the material surface in two mutually perpendicular directions of the stress field in question, it is suitable to perform the measurements in such a manner that four parallel holes are drilled through the material and the spacing between the holes is measured at different levels. The measuring body referred to is then chosen in such a way as to include the holes, and the abovementioned process of exposing the measuring body in a stepwise manner in connection with the corresponding measurements is performed. After the measuring body has been worked completely free from the material, the spacings between the holes are again measured at the same levels as before and the deformation is read, whereupon the stresses occurring at the respective levels are computed with the aid of conventional formulas which are well known in the art.

Figure 2:
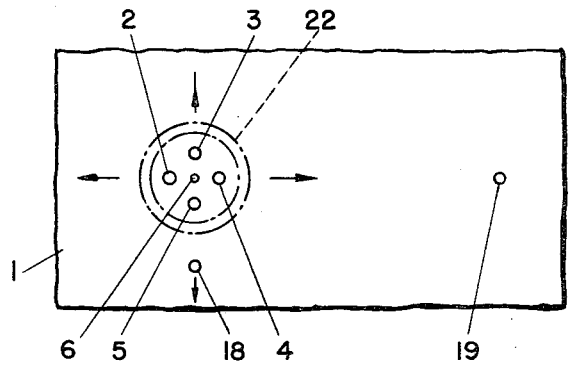
Figure 3:
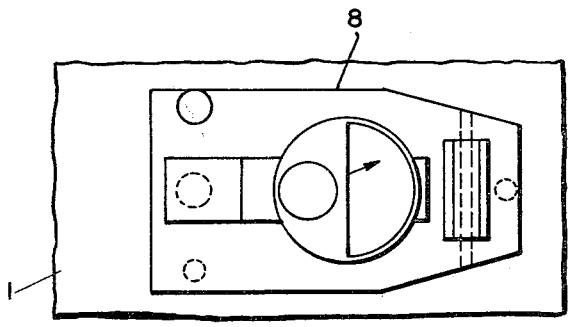

The method and an apparatus according to the invention will be explained in more detail in connection with the description of an embodiment shown on the annexed drawings. FIGS. 1 and 2 show a section and a plan view, respectively, of a material having inherent stresses and the taking of a sample thereof. FIG. 3 shows the test material in plan view with a measuring apparatus applied to it. FIGS. 4 and 5 show side views of the measuring apparatus with sections of the test material underneath it. FIGS. 6 and 7 show similar sections as in FIG. 1 with utilization of the measuring method according to the invention.

For the explanation of a practical application of the invention, it is assumed that a welded sheet 1, FIGS. 1 and 2, exhibits inherent stresses, the problem being to find the magnitude of the stresses at the surfaces of and inside the sheet normal to the surfaces of the sheet 1 as well as in two mutually perpendicular directions parallel to its surface and indicated by arrows in FIG. 2.

To this end, four holes 2 to 5 are first bored through the sheet 1. A suitable diameter of the holes is 3 millimeters and the spacing between the holes 2 and 4 or 3 and 4, respectively, is suitably 9 millimeters. These spacings are measured and taken down for different levels in the sheet measured accurately and recorded at different levels in the depth of the specimen.

Two markings 6 and 7 are then applied opposite each other on the over- and underside of the sheet within the holes 2 to 5. A measuring apparatus according to FIGS. 3 to 5 is placed over the sheet. This measuring apparatus, in a simple embodiment, comprises a support 8 having three legs 9, 10 and 11, two of which, 10 and 11, are preferably flexible in mutually perpendicular directions owing to the presence of thinner portions 12 and 13 of leaf-spring construction, the third leg 9 being adjustable vertically in the support 8. On the underside of the support, a gauging arm 14 is rotatably fastened and carries a downwardly directed projection 15. On top of the support there is mounted a sensitive indicator 16, the movable gauging pin 17 of which rests on the gauging arm 14. All of the legs 9 to 11 and the projection 15 terminate as semi-spherical end portions or by balls mounted at the ends.

A pair of recesses 18 and 19 are formed in the sheet 1 so as to accommodate the legs 10 and 11 when the projection 15 is placed over the marking 6. The elastic properties of the legs 10 and 11 makes it easier for them to fit securely into the recesses even in the case of minor deviations of the spacings between the projection 15 and the legs 10 or 11, respectively, relative to the spacings between the marking 6 and the recesses 18 or 19, respectively, occurring in the boring of the recesses. Similar recesses 20 and 21 are formed relative to the marking 7.

The entire measuring apparatus is placed on the sheet 1 with the legs 10 and 11 fitting into the recesses 18 and 19 and the projection 15 contacting the marking 6, whereupon a certain adjustment or initial position is given to the indicator through an adjustment of the leg 9. This initial position is recorded. The measuring apparatus is then transferred to a standard gauge and the new reading of the indicator is recorded. The same procedure is repeated on the other side of the sheet 1 relative to the marking 7.

There is then formed according to FIG. 6 a circular groove 22, preferably with the aid of a tool according to FIG. 15 of U.S. patent application No. 691,488, filed Oct. 21, 1957, now abandoned, as indicated by dash-dot lines in FIG. 2 outside of the holes 2 to 5 and without contact therewith. This groove 22 is made of only a limited depth Z and a measuring body 23 of limited height is thus exposed. The same measuring procedure as before is then performed on both sides of the sheet and the values obtained upon comparison with the standard gauge are taken down. The groove 22 is deepened to the depth 2Z and the measuring procedure is repeated. This procedure is continued until the groove 22 has penetrated through the sheet 1. The measuring body 23 thus liberated is subjected to measurement of the spacings between the holes 2 and 4 or 3 and 5 at levels previously measured within the holes and information is thereby obtained about deformations that may have occurred parallel to the sheet surface. In connection with the stepwise exposure of the measuring body information about the mutual changes in spacing between the markings 6 and 7, i.e. in a direction normal to the sheet is obtained, and in connection with the last mentioned measurement in the holes 2 to 5 information about deformations in two mutually perpendicular directions, both parallel to the sheet surface is obtained. Starting from the values of these deformations, the inherent stresses are then computed with the aid of the conventional formulas. The application of the invention has thus made possible the measurement of tri-axial inherent stresses within the material. This has been done without the necessity of any material-destroying test process, since the hole formed through the removal of the measuring body can easily be filled, for instance by welding. In those cases when inherent stresses that may occur parallel to the sheet are of no interest, it is enough to take measurements only in connection with the exposure of the measuring body and the holes 2 to 5 do not have to be provided. Furthermore, a limitation to only two holes as well as an increase of their number to, for instance, six may at times be suitable.

In the embodiment described, the levels of the markings 6 and 7 relative to the adjacent sheet surface have been determined in order to find the mutual position of the markings. In some cases, apparatus may be used for direct measuring of these spacings.

Instead of the markings 6 and 7 it is possible to use a levelled surface or measuring area. The sideward guiding of the measuring instrument is then brought about by letting the leg 9 be guided in a recess on the surface of the test object. In that case, only the leg 11 need be flexible. The change in spacing may suitably be measured at several points on the over- and underside of the measuring body, from which an average may be computed to yield the mutual displacement of the levelled surface portions.

What is claimed is:

1. A method of measuring the inherent stresses in a body, comprising the forming of a marking on a surface of the body, forming a second marking on the surface opposite the first mentioned surface, said markings being aligned in a plane normal to the said surfaces, forming an annular groove in one of said surfaces spaced about the marking thereon, and measuring variation in the spacing of the markings in said plane as the groove is progressively deepened in the body toward the other of said faces.

2. A method according to claim 6 wherein the variation is measured by successive determinations of the spacing of the markings relative to one another.

3. A method according to claim 1 wherein the variation is measured by successive determinations of the spacing of the markings relative to a fixed point on the body outside of said groove.

4. A method according to claim 1 wherein the annular groove is formed with said marking as its center point.

5. A method according to claim 1 further comprising forming at least two spaced holes in the body spaced within said groove and measuring variation in the spacing of the holes as the groove is progressively deepened in the body toward the other of said surfaces.

6. A method according to claim 5 wherein four parallel holes are formed in the body spaced within said groove, said holes being spaced equidistant from one another about said marking, and the variation in the spacing of the holes one from another is measured as the groove is progressively deepened in the body toward the other of said faces to determine the stress field in planes extending parallel to the grooved face of the body.

References Cited in the file of this patent

UNITED STATES PATENTS

| | | |
|---|---|---|
| 1,303,387 | Pogue | May 13, 1919 |
| 1,563,468 | Carreau | Dec. 1, 1925 |
| 2,028,514 | Mathar | Jan. 21, 1936 |
| 2,763,154 | Kohn et al. | Sept. 18, 1956 |
| 2,898,761 | Hast | Aug. 11, 1959 |

FOREIGN PATENTS

| | | |
|---|---|---|
| 151,797 | Sweden | Oct. 4, 1955 |